US012656761B2

(12) United States Patent
Han

(10) Patent No.: US 12,656,761 B2
(45) Date of Patent: Jun. 16, 2026

(54) AUTOMATED CYPHER CONFIGURATION OF INDUSTRIAL DEVICES

(71) Applicant: Schneider Electric USA, Inc., Andover, MA (US)

(72) Inventor: Qing Sheng Han, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 620 days.

(21) Appl. No.: 18/089,278

(22) Filed: Dec. 27, 2022

(65) Prior Publication Data

US 2024/0210920 A1 Jun. 27, 2024

(51) Int. Cl.
*G05B 19/418* (2006.01)

(52) U.S. Cl.
CPC ............... *G05B 19/4185* (2013.01); *G05B 2219/25205* (2013.01)

(58) Field of Classification Search
CPC ...... G05B 19/4185; G05B 2219/25205; G06F 9/4401; H04W 12/043; H04L 63/04; H04L 67/12; H04L 67/34; H04L 63/20; H04L 9/0891; H04L 9/0866; H04L 9/0872
See application file for complete search history.

(56) References Cited

U.S. PATENT DOCUMENTS 10,621,352 B2   4/2020   Nix
2007/0058814 A1*   3/2007   Robinson .............. H04L 9/0662
380/280

2007/0199061 A1*   8/2007   Byres .................. H04L 41/0806
726/11
2008/0091936 A1*   4/2008   Ikkanzaka ............. H04L 9/3247
713/150
2010/0268936 A1*   10/2010   Matsushima ........... G06F 21/62
713/153
2017/0214717 A1*   7/2017   Bush .................. G05B 19/4185
2017/0302456 A1*   10/2017   Visoky ............... G05B 19/4185
(Continued)

FOREIGN PATENT DOCUMENTS

JP       2017097376 A       6/2017

OTHER PUBLICATIONS

Extended European Search Report for European Patent Application No. EP23219034.8, dated May 22, 2024.
(Continued)

*Primary Examiner* — Kidest Worku
(74) *Attorney, Agent, or Firm* — Wolf, Greenfield & Sacks, P.C.

(57) ABSTRACT

A method of automating cypher configuration for a plurality of industrial devices within an industrial system is provided. The method includes receiving system parameters for the industrial system and receiving from a data source device parameters for respective individual industrial devices of the plurality of industrial devices. The method further includes selecting, generating and/or updating an optimal cypher configuration for the respective individual industrial devices based on or using the system parameters for the industrial system and the device parameters for the respective individual devices. The method further includes providing the optimal cypher configuration to the respective individual industrial devices for configuration of the respective individual industrial devices' cypher configuration.

17 Claims, 3 Drawing Sheets

(56) References Cited

U.S. PATENT DOCUMENTS

| | | | | |
|---|---|---|---|---|
| 2019/0089744 A1* | 3/2019 | Hornung | ................. | H04L 63/20 |
| 2019/0163912 A1* | 5/2019 | Kumar | .................. | H04L 9/0825 |
| 2019/0245679 A1* | 8/2019 | Suresh | ..................... | G09C 1/00 |
| 2019/0318127 A1* | 10/2019 | Pan | ......................... | G06F 21/60 |
| 2020/0014675 A1 | 1/2020 | Helms et al. | | |
| 2021/0409232 A1 | 12/2021 | Danilchenko et al. | | |

OTHER PUBLICATIONS

Danilchenko Victor, et al.: "Bootstrapping Security Configuration for IoT Devices on Networks with TLS Inspection", 2019 IEEE Globecom Workshops (GC Wkshps), IEEE, Dec. 9, 2019, pp. 1-7, XP033735036, DOI: 10.1109/GCWKSHPS45667.2019.9024325—retrieved on Mar. 4, 2020.
Viacheslav Zolotnikov: "Industrial Internet of Things: vol. G4—Security Framework", IEEE Draft WGDS; 862055733031, IEEE—SA Imeet Central, Piscataway, NJ USA vol. 2413 May 25, 2016, pp. 1-144, XP068219045, Retrieved from the Internet: URL:https://ieee-sa.imeetcentral.com/p/aQAAAACu6SU—retrieved on Jul. 31, 2023.

* cited by examiner

AUTOMATED CYPHER CONFIGURATION OF INDUSTRIAL DEVICES

TECHNICAL FIELD

The present disclosure relates to configuration of industrial devices, and more particularly, to automated cypher configuration of industrial devices

BACKGROUND

The industrial devices in an industrial setting can be configured with cryptography algorithms, herein referred to as a cypher configuration. A cypher configuration can specify algorithms used for encrypting, decrypting, hashing, digital signature, key exchange, etc. The cypher configuration needs to take many factors into consideration, such as computation power of the device. The cypher configuration may be made, and may even be locked, before such factors are known, such as at the time of manufacture. Selection of which cypher configuration to use is typically decided by developers that need to have adequate training and experience. The result can be inconsistent and/or inferior, especially if made with insufficient information.

Inadequate security coverage by a cypher configuration can result in a cybersecurity vulnerability or a cybersecurity regulation violation. On the other hand, computation performed on a device using the cryptographic algorithms takes a high percentage of CPU utilization and can further cause a bottleneck for real-time device communication. To complicate things further, cypher configurations can become outdated as new security threats develop, while cypher configurations remain static and locked.

In an industrial setting, many industrial devices can be deployed. These devices can include, for example, motor controllers, motion controllers, machine drives, switches, sensors, etc. An industrial device deployed in a nuclear plant has different cybersecurity requirements than a device deployed in a food processing plant, consequently these devices should have different cypher configurations. The time, expertise, and skill needed to select and configure the appropriate cybersecurity configuration is costly and cumbersome, and may be performed before relevant information is available.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method for automatic cypher configuration of a plurality of industrial devices within an industrial system. The method includes receiving system parameters for the industrial system, receiving from a data source device parameters for respective individual industrial devices of the plurality of industrial devices, and selecting, generating and/or updating an optimal cypher configuration for the respective individual industrial devices based on (or using) the system parameters for the industrial system and the device parameters for the respective individual devices. The method further includes providing the optimal cypher configuration to the respective individual industrial devices for configuration of the respective individual industrial devices' cypher configuration.

In one or more embodiments, the method can further include receiving update data, monitoring the update data for impactful changes that impact cypher configuration needs of the industrial system and/or the plurality of industrial devices, and in response to determining at least one impactful change has occurred, determining if the previously determined optimal cypher configuration for the at least one of the respective individual industrial devices is still optimal. The method can further include, in response to determining the previously determined optimal cypher configuration for the at least one of the respective individual industrial devices is no longer optimal, determining a new optimal cypher configuration for at least one of the respective individual industrial devices.

In one or more embodiments, the method can further include providing the determined optimal cypher configuration to the at least one of the respective individual industrial devices for updating configuration of the respective individual industrial devices' cypher configuration.

In one or more embodiments, the impactful change can be a change to a threat landscape of the industrial system and/or a change to a regulatory requirement relevant the industrial system.

In one or more embodiments, the generated or updated optimal cypher configuration for a particular individual industrial device of the respective individual industrial devices can be customized for the particular individual industrial device.

In one or more embodiments, the device parameters for a particular individual industrial device of the respective individual industrial devices can include at least one of computation power of the particular individual industrial device, hardware acceleration capabilities for cypher computation of the particular individual industrial device, and geographic location of the particular individual industrial device.

In one or more embodiments, the system parameters for the industrial system can include target security level (SL).

In one or more embodiments, the data source from which the device parameters for a particular individual industrial device of the plurality of industrial devices can be the particular individual industrial device.

In one or more embodiments, the method can be performed at a central location.

In accordance with further aspects of the disclosure, a method of automating cypher configuration of an industrial device of an industrial system is provided. The method includes connecting with a central cypher configuration module providing centralized cypher configuration for the industrial system and receiving an optimal cypher configuration. The optimal cypher configuration is customized for the industrial device based on (or using) system parameters for the industrial system and device parameters for the industrial device, the system parameters indicating at least a target security level of the industrial system and the device parameters indicating at least one of computation power of the industrial device, hardware acceleration capabilities for cypher computation of the industrial device, and geographic location of the industrial device. The method further includes configuring the industrial device's cypher configuration using the optimal cypher configuration, and receiving new optimal cypher configuration from the central cypher configuration module, the new optimal cypher configuration being determined based on a determination by the cypher configuration module that at least one relevant impactful change has occurred as indicated by update data from an external update server.

In one or more embodiments, wherein the impactful change can be a change to a threat landscape of the industrial system and/or a change to a regulatory requirement relevant the industrial system.

In one or more embodiments, the method can further include providing the device parameters to the central cypher configuration module.

In accordance with further aspects of the disclosure, a central cypher configuration module and/or an industrial device station are provided that each include one or more memories configured to store instructions and one or more processors in communication with the stored instructions, wherein the respective processors upon execution of the instructions are each configured to perform the corresponding method.

In accordance with still further aspects of the disclosure a non-transitory computer readable storage medium and one or more computer programs embedded therein is provided for one or more of the disclosed methods. When executed by a corresponding computer system of one or more computer systems, the one or more computer programs cause the corresponding computer system to perform the corresponding disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
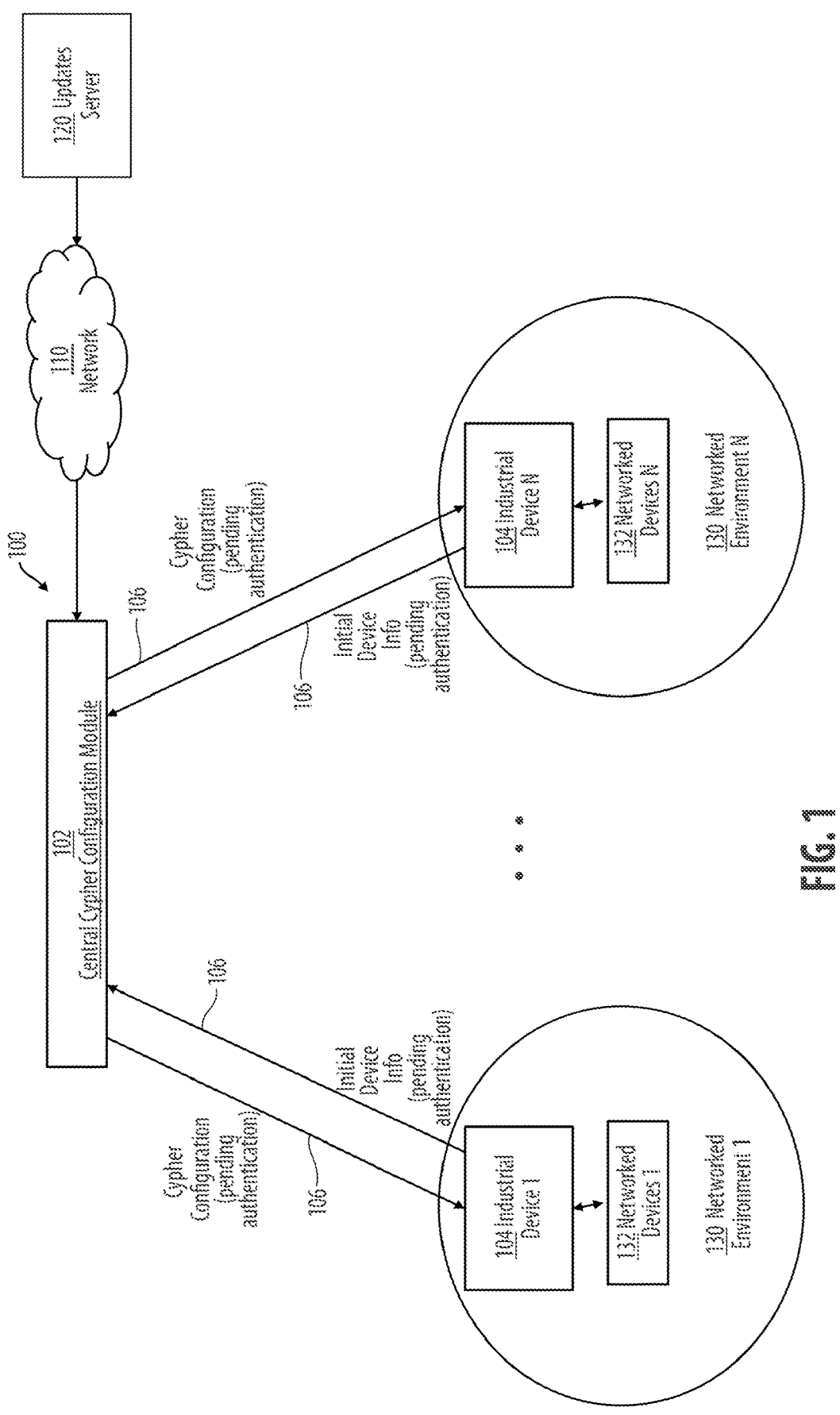
FIG. 1 is a block diagram illustrating an example cypher configuration system, in accordance with one or more embodiments of the disclosure.

With reference now to the drawings, for purposes of explanation and illustration, and not limitation, a block diagram of an exemplary embodiment of a cypher configuration system in accordance with the disclosure is shown in FIG. 1, wherein the cypher configuration system is designated generally by reference character 100. Methods associated with customized configuration of devices in accordance with the disclosure, or aspects thereof, are provided in FIGS. 2 and 3, as will be described.

Turning now descriptively to the drawings, in which similar reference characters denote similar elements throughout the several views, FIG. 1 is a block diagram illustrating an exemplary cypher configuration system 100. Cypher configuration system 100 includes a central cypher configuration module 102 and a plurality of industrial devices 1-N 104, referred to generally as industrial devices 104. Industrial devices 104 are configured to communicate with central cypher configuration module 102 via wired or wireless communication links 106 to initialize and/or update their respective cypher configurations.

Central cypher configuration module 102 is a computer having a processing device, such as a cloud-based or local server, laptop computer, mobile smart device, etc. Central cypher configuration module 102 is configured to communicate with individual industrial devices 104 (meaning industrial device-1-industrial device-N) via wired or wireless communication links 106, individually or simultaneously, to pull (or otherwise receive) a cypher profile from individual industrial devices 104, assess the cypher profile, select and push (or otherwise provide) an initial or updated cypher configuration per individual industrial device 104 based on its corresponding cypher profile and/or the current threat landscape, and receive updates about a threat landscape or regulation requirements from an updates server 120 via a network 110. Network 110 can be implemented using a local area network (LAN), private or public wide area network (WAN), virtual private network (VPN), enterprise network, or the like.

Industrial devices 104 are smart devices that are each configured to operate within a corresponding networked environment 130 (networked environments 1-networked environments N) for communicating with corresponding networked devices 132 (networked devices-1-networked devices-N), and need appropriate cypher configurations for communicating within each of their respective networked environments 130. An industrial device 104 can be a smart mobile device, a fixed or mobile computing device, a smart appliance that includes an embedded processor, a smart sensor, a smart circuit breaker, an embedded system, a controller, etc. Each industrial device includes a processing device, such as a central processing unit (CPU), microprocessor, field programmable gate array (FPGA), application-specific integrated circuit (ASIC), digital signal processor (DSP), logic circuit, etc. Industrial devices 104 can be physical devices or virtual devices that associated with a physical device. Each networked device 132 of a particular networked environment 130 can be configured as an industrial device 104 for initially configuring or updating over time its cypher configuration.

The respective networked environments 130 can be implemented using a LAN, private or public WAN, VPN, enterprise network, or the like. One or more of networked environments 1-N 130 and/or network 110 can partially or completely overlap one another, meaning they share one or more physical components. Some or all networked devices 132 can be included in more than one networked environment 1-N 130. One or more of networked environments 1-N 130 and/or network 110 can be included in an industrial system, such as an industrial process plant or a network of industrial process plants.

Different networked environments 1-N 130 can be located in different geographical locations (e.g., the United States (US), the European Union (EU), Russia, China, etc.) that have different cypher regulations. Any single networked environment 130 can operate in different geographical locations that have different cypher requirements. For example, a first portion of networked environment 1 can be in a geographic area governed by the US and a second portion can be in a geographic area governed by the EU. Different networked environments 1-N 130 can include networked devices 132 that have different security levels (SL) that each have different cypher requirements, e.g., provide differing strengths of encryption. For example networked environment 1 130 can be a nuclear plant that requires a stronger level of encryption, and networked environment N 130 can be a food processing plant that can use a weaker level of encryption. Additionally, different networked devices 132 in any single networked environment 130 can have different security levels that have different cypher requirements.

Central cypher configuration module 102 can be configured to detect and pair with an industrial device 104 as well as networked devices 132 in the same networked environment 132. Central cypher configuration module 102 can connect with and configure the cypher configuration of the industrial device 104 and networked devices 132 (treating each networked device 132 as industrial device 104. The detection of, pairing with, connection with, configuration of industrial device 104 and networked devices 132 in its network environment 130 can be performed serially or in parallel.

In one or more embodiments, central cypher configuration module 102 is a mobile device that can be moved in the vicinity of a network 130N for pairing (e.g., via Bluetooth® or another wired or wireless connection) with industrial device 104N and nearby networked devices 132N. In one or more embodiments, central cypher configuration module 102 is a non-mobile server of an enterprise network of a single industrial company that can include one or more network environments 130, wherein central cypher configuration module 102 communicates with industrial device 104 and other networked devices 132 via wired or wireless communication links 106. In one or more embodiments, central cypher configuration module 102 is a cloud-based server that provides a cypher configuration service to networks of different industrial companies.

For example, industrial devices 104 can each be configured to detect or be detected by central cypher configuration module 102, and can be further configured to pair and connect with central cypher configuration module 102. Industrial device 104 is further configured for its cypher configuration to be unlocked so that it can be setup and/or updated by central cypher configuration module 102 pending appropriate authentication.

In addition, networked devices 132 in a single networked environment 130 can have different computation powers. For example, networked environment 1 can include some networked devices 132 that are embedded systems for which an elliptic curves cryptography (ECC) algorithm for an asymmetric key would be an appropriate cypher configuration as well as high end programmable logic controller (PLC) for which an asymmetric encryption algorithm, such as the Rivest-Shamir-Adleman (RSA) encryption algorithm would be appropriate.

Central cypher configuration module 102 can individually evaluate each industrial device 104 that is connected to it, e.g., via communication links 106, to perform a cypher configuration operation. For each cypher configuration operation, an authentication procedure can be required before information is transferred between industrial device 104 and central cypher configuration module 102. Two-way authentication can be required such that each of central cypher configuration module 102 and industrial device 104 have been authenticated by the other before sending and/or receiving data to or from the other. Additionally or alternatively, two-way authentication can be required for transfer of data to or from different networked environments 1-N 130 as well as the respective networked devices 1-N 132. In one or more embodiments, central cypher configuration module 102 can be responsible to pull and push all information transferred. In other embodiments, industrial device 104 can initiate and/or perform a data transfer in either direction.

Upon establishing communication and any necessary authentication between central cypher configuration module 102 and an industrial device 104, initial device information for industrial device 104's is provided to central cypher configuration module 102. The initial device information can include, for example, device capability (e.g., computation power, availability of hardware (HW) acceleration, etc.), device geographic location, and device security level.

Information can be exchanged between central cypher configuration model 102 and device 104 via JavaScript® object notation (JSON) file transfers. The file transfers can use secure communication, such as by using transport layer security (TLS) protocol to avoid spoofing and tampering.

An example JSON file used to send information from industrial device 104 to central cypher configuration module 102 is shown below:

```
{
    "DeviceName": "Schneider1234",
    "DeviceIP": "192.168.0.100",
    "Country": "United Status",
    "SystemSecurityLevel": "3"
    "AsymmetricKey": {
        "Algorithm": "ECC",
        "KeySize": "224",
    },
    "SymmetricKey": {
        "Algorithm": "AES_256_GCM",
    },
    "KeyExchange": {
        "Algorithm": "ECDHE",
    },
    "Signature": {
        "Algorithm": "ECDSA",
    },
    "Hashing": {
        "Algorithm": "SHA256",
    }
}
```

An example JSON file used to send cypher configuration information from central cypher configuration module 102 to industrial device 104 to is shown below:

```
{
    "DeviceName": "Schneider1234",
    "MAC_Address": "00:80:F4:50:02:5D"
    "DeviceIP": "192.168.0.100",
    "Country": "United Status",
    "OS": "VxWorks",
    "OS_Version": "V7.0_SR640",
    "DeviceCategory": {
        "Device Category": "PC",
    },
    "Hardware": {
        "CPU": "Core i5-8265U",
        "Cores": "4",
            "Frequency": "1.6GHz",
            "RAM": "4G",
    },
    "HardwareAcceleration": {
```

-continued

```
        "SecureElement": "Infineon Trust Mv3",
        "TPM": "none",
    }
}
```

Updates server 120 includes one or more computing devices that distribute information about changes in the threat landscape and/or changes in regulation requirements, such as by relevant governing agencies of countries, states, regulatory boards, etc. Updates server 120 can monitor for the updates and distribute the updates to central cypher configuration module 102 or can receive the updates from other entities and distribute the updates to central cypher configuration module 102. The updates can include new susceptibilities, such as new types of attacks or identification of cryptographic algorithms that have been breached. This information can be used to remove or replace vulnerable cryptographic algorithms.

Figure 2:
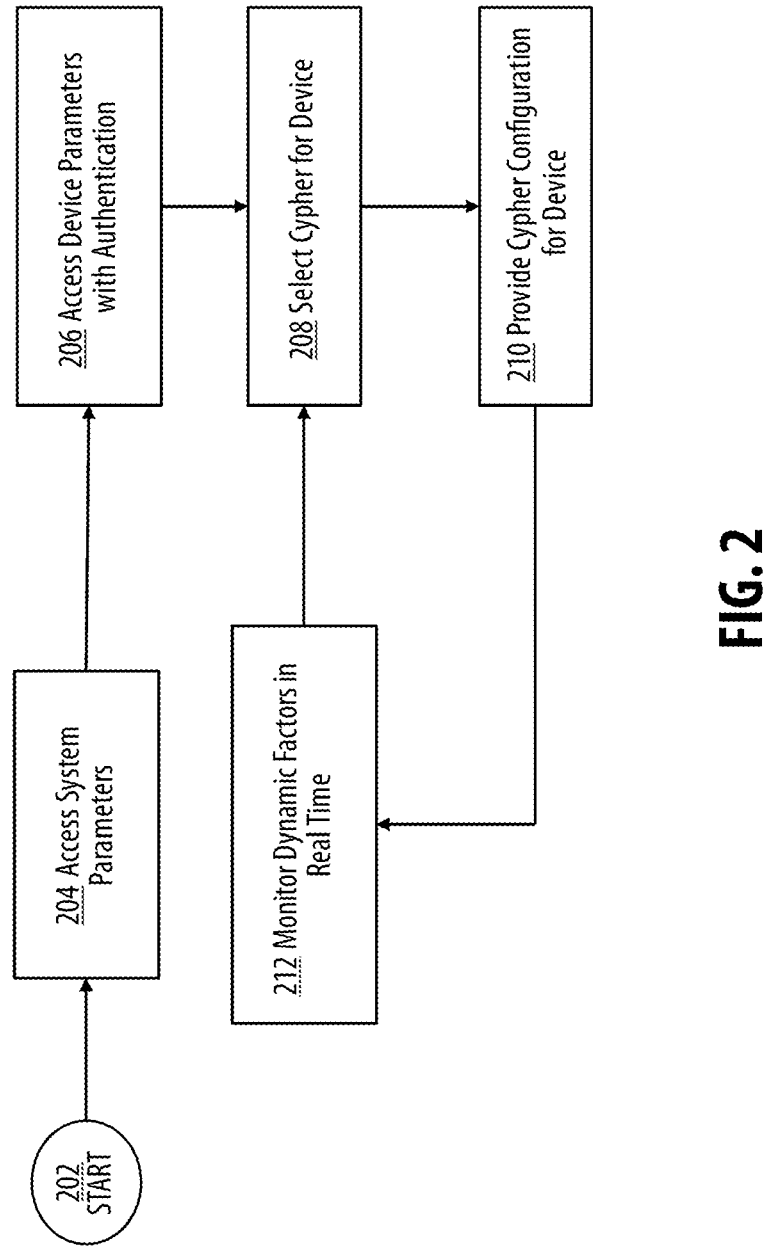
FIG. 2 is a state diagram illustrating an example method for configuring cryptography algorithms used by an industrial device, in accordance with one or more embodiments of the disclosure.

As described in greater detail with respect to a state diagram in FIG. 2, central cypher configuration module 102 selects a cypher configuration for each industrial device 104 based on its system and particular device parameters. Central cypher configuration module 102 causes the industrial device 104 to be configured based on the selected cypher configuration. Central cypher configuration module 102 continues to update the cypher configuration based on updates to the threat landscape and/or updates to regulatory requirements.

With reference now to FIG. 2, shown is a state diagram demonstrating example implementation of the various exemplary embodiments. It is noted that the order of blocks shown in FIG. 2 is not required, so in principle, the various blocks may be performed out of the illustrated order or in parallel. Also certain blocks may be skipped, different blocks may be added or substituted, or selected blocks or groups of blocks may be performed in a separate application following the embodiments described herein.

FIG. 2 illustrates a state diagram that shows an example method performed for configuring cypher for (meaning cryptography algorithms used by) an industrial device, such as industrial device 104 shown in FIG. 1 by a central cypher configuration module, such as central cypher configuration module 102 shown in FIG. 1. The industrial device is registered with the central cypher configuration module prior to beginning a cypher configuration operation on the industrial device. The registration process provides information needed by each of the industrial device and the central cypher configuration module to authenticate one another before sending or receiving data. The A device ID for the industrial device will be registered, such as an international mobile equipment identity (IMEI), mobile equipment identification (MEID), internet protocol (IP) address, media access control (MAC) address, assigned name, identifying features, etc. In addition, the registration process can store system parameters for the industrial device to be associated with its device ID. Each time that an industrial device is relocated or otherwise undergoes a significant change within its networked environment, the industrial device needs to be re-registered with updated information. This could arise, for example, when an industrial device is moved from one secure zone to another secure zone, wherein the two secure zones have different security levels.

At start block 202, the cypher configuration operation is initiated, such as by establishing communication with the industrial device to central cypher configuration module and/or submitting a request to start the cypher configuration operation. The request can be submitted to the central cypher configuration module, for example and without limitation, by the industrial device, by an administrator via a user interface of the central cypher configuration module, and/or by an external processing device via an interface of the central cypher configuration module for interfacing with external devices. The request identifies the industrial device using the device ID.

At block 204, system parameters stored in association with the industrial device's device ID are accessed. The central cypher configuration module can use the device ID to access the system parameters. The system parameters can include, for example, information about the industrial device's networked environment (such as networked environment 130 shown in FIG. 1) and/or about the industrial device with its networked environment. The system parameters could include, for example, geographic location (e.g., country) and industry type. These parameters impact the target security level and government mandatory cryptographic algorithm suites that would need to be applied.

Prior to performance of block 204, the system parameters can be received and stored, such as during a registration process, by user input by an administrator, by information received from an external processing device, etc. The system parameters can be obtained with or without human intervention. For example, an administrator can input the geographic location and target Security Level of the system.

At block 206, device parameters for the industrial device are accessed. The device parameters can be obtained by the central cypher configuration module pulling, requesting, and/or reading the information from a data source or by the data source transmitting the information to the central cypher configuration module. The device parameters can be obtained with or without human intervention. The data source can be the industrial device, a user input device via which the device parameters are entered manually, an external processing device, etc. The device parameters can include, for example, computation power and/or availability of HW acceleration.

For example, central cypher configuration model 102 can discover devices in the system automatically with a discovery protocol, such as devices profile for web services (DPWS) or simple service discovery protocol (SSDP). Once one or more industrial devices 104 are discovered, central cypher configuration model 102 can pull the device parameters from the respective discovered industrial devices 104 using secure communication. After processing the device parameters and the system paremeters, central cypher configuration model 102 can send the cypher configuration to individual device. At block 208, central cypher configuration module analyzes the system and device parameters and uses the analysis to select, generate, and/or update an optimal cypher configuration. The analysis uses the industrial device parameters to determine computation power of the industrial device, including whether HW acceleration is implemented. The analysis also takes into consideration system parameters, such as geographic location and/or factors that affect a security level of the industrial device. Geographic location is used to assure that the cypher configuration satisfies any regulations that are sensitive to geographic location. The analysis assures that the cypher configuration is tuned to a target security level needed by the industrial device. Furthermore, the analysis uses the current threat landscape to protect any vulnerabilities exposed by a threat. The threats can include newly detected malware, newly detected methods of attack, application of quantum computation to foil current cypher configurations, etc.

With the development of quantum computing, the optimal cypher configuration for an industrial device 104 that has a long life (e.g., a relatively new programmable logic controller (PLC)) can include quantum-safe cryptographic algorithms, whereas quantum-safe cryptographic algorithms may not be needed for industrial devices 104 that have a short life time device, such as a cell phone. The current regulations to apply and current threat landscape can be updated by the central cypher configuration module by receiving updates about regulations and threats, as these can be dynamic, e.g., from an updates server, such as updates server 120 shown in FIG. 1. When performing block 208 the first time for generating an initial cypher configuration, the most recently updated regulations and threats are used.

An optimal cypher configuration is a cypher configuration that is selected, generated, and/or updated by taking multiple parameters into consideration to achieve a level and type of cypher configuration that is suitable for each individual parameter of the individual parameters. For example, the cypher configuration is optimized to use an amount of processing power that is best suited for the industrial device's available processing power as well as an amount of security coverage that is commensurate with the security needs of the industrial device and the network environment and/or system in which the industrial device resides. The optimized cypher configuration needed can be determined by balancing the various parameters. The cypher configuration is further optimized to satisfy requirements, such as based on its geographic location and relevant regulations as well as to provide protection from threats included in the current threat landscape.

At block 210, the optimal cypher configuration is provided to the industrial device, such as by pushing and/or responding to a request.

At block 212, dynamic factors are monitored, such as by receiving updates from the updates server. Updates from the updates server can be received at periodic intervals or in response to an event (such as a request by the central cypher configuration module, a detection of a new update by the updates server, etc.).

Block 208 can be repeated, e.g., continuously at regular intervals or in response to a notification by updates server that a new update is available. For example, if a new update indicates that a currently used cypher has been broken (e.g., due to a quantum computation), the optimal cypher configuration should replace that algorithm. Blocks 208, 210, and 212 can form a loop so that the cypher configuration is updated with new updates provided by the updates server.

The method of FIG. 2 can be automatically performed in series or in parallel for individual industrial devices or individual groups of industrial devices of an industrial system, such as industrial system 100 shown in FIG. 1. In this way, the cypher configuration is customized per industrial device based on the system parameters of its industrial system and based on the device parameters for the individual device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
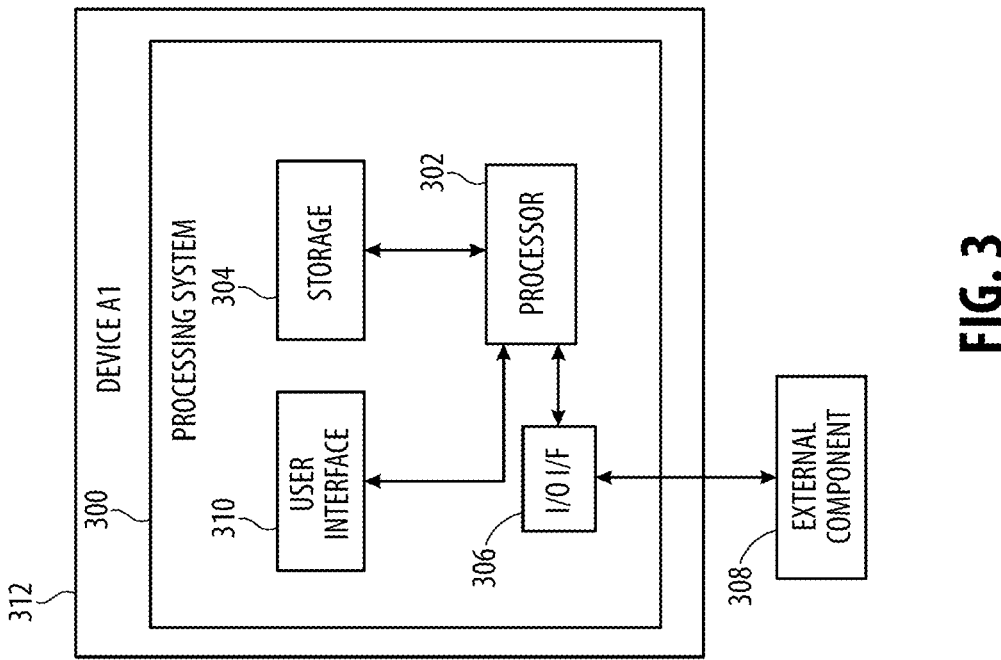
FIG. 3 is a block diagram of an example computer system used for implementation of a central cypher configuration module shown in FIG. 1, in accordance with embodiments of the invention.

With reference to FIG. 3, a block diagram of an example processing system 300 is shown, which provides an example configuration of a processing system that could be included in central cypher configuration module 102, industrial devices 104, and networked devices 132 of FIG. 1. In one or more embodiments, processing system 300 could be embedded in an intelligent device, such as device A1 referenced by reference numeral 312. For example, industrial device 104 can be a smart sensor or controller that includes an embedded processor such as processing system 300. In one or more embodiments, processing system 300 could be a free-standing processing system, such as a server, desktop computer, portable computer, or handheld computer. Processing system 300 is only one example of a suitable system and is not intended to suggest any limitation as to the scope of use or functionality of embodiments of the disclosure described herein. Processing system 300 can be implemented using hardware, software, and/or firmware. Regardless, processing system 300 is capable of being implemented and/or performing functionality as set forth in the disclosure.

Processing system 300 is shown in the form of a general-purpose computing device. Processing system 300 includes a processing device 302, memory 304, an input/output (I/O) interface (I/F) 306 that can communicate with an internal component, such as a user interface 310, and optionally an external component 308.

The processing device 302 can include, for example, a programmable logic device (PLD), microprocessor, DSP, a microcontroller, an FPGA, an ASIC, and/or other discrete or integrated logic circuitry having similar processing capabilities.

The processing device 302 and the memory 304 can be included in components provided in the FPGA, ASIC, microcontroller, or microprocessor, for example. Memory 304 can include, for example, volatile and non-volatile memory for storing data temporarily or long term, and for storing programmable instructions executable by the processing device 302. Memory 304 can be a removable (e.g., portable) memory for storage of program instructions. I/O I/F 306 can include an interface and/or conductors to couple to the one or more internal components, such as user interface 310 and/or external components 308.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of classifier 102 may be implemented or executed by one or more computer systems, such as a microprocessor. Each computer system 300 can be included within central cypher configuration module 102, industrial devices 104, and networked devices 132, or multiple instances thereof. In various embodiments, computer system 300 may include one or more of a microprocessor, an FPGA, application specific integrated circuit (ASIC), microcontroller. The computer system 300 can be provided as an embedded device. Portions of the computer system 300 can be provided externally, such by way of a virtual, centralized, and/or cloud-based computer.

Computer system 300 is only one example of a suitable system and is not intended to suggest any limitation as to the scope of use or functionality of embodiments of the disclosure described herein. Regardless, computer system 300 is capable of being implemented and/or performing any of the functionality set forth hereinabove.

Computer system 300 may be described in the general context of computer system-executable instructions, such as program modules, being executed by a computer system. Generally, program modules may include routines, programs, objects, components, logic, data structures, and so on that perform particular tasks or implement particular abstract data types.

Potential advantages provided by cypher configuration system 100 shown and described include the ability to select and implement cypher configurations automatically for individual devices of a network in order to optimize processing utilization and security level per device, which increases security for the individual devices and for the devices' network environment and any system in which the individual devices reside. The system is centralized and automated, which reduces dependency on skilled engineers and reduces inconsistencies due to human factors. Additionally, the automated and centralized updates to the cypher configuration coupled with updates from update server 120 enables a most up-to-date cypher configuration based on the threat landscape and state of regulations at the time of the initial cypher configuration and a dynamically updated cypher configuration in real time based on changes to the threat landscape and state of regulations. In this way, industrial devices are not configured with fixed cryptographic algorithms that cannot be updated to adapt to different configurations or conditions. On the contrary, the industrial devices are agile in that their cryptographic algorithms can be customized and updated as conditions change.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.).

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of automating cypher configuration for a plurality of industrial devices within an industrial system, the method comprising:

receiving system parameters for the industrial system;

receiving from a data source device parameters for respective individual industrial devices of the plurality of industrial devices;

selecting, generating, and/or updating an optimal cypher configuration for the respective individual industrial devices based on or using the system parameters for the industrial system and the device parameters for the respective individual devices, wherein different cypher configurations have different strengths of applied encryption;

providing the respective optimal cypher configurations to the corresponding individual industrial devices for configuration of the individual industrial devices' cypher configuration;

receiving update data;

monitoring the update data for changes that impact cypher configuration needs of the industrial system and/or the plurality of industrial devices;

in response to determining at least one change has occurred, determining if the optimal cypher configuration previously determined for the at least one of the respective individual industrial devices is still optimal;

in response to determining the optimal cypher configuration previously determined for the at least one of the respective individual industrial devices is no longer optimal, determining a new optimal cypher configuration for at least one of the respective individual industrial devices; and providing the respective new optimal cypher configuration(s) to the corresponding individual industrial devices of the at least one of the respective individual industrial devices for updated configuration of the at least one respective individual industrial devices' cypher configurations, including causing configuration of the at least one of the respective individual industrial devices using the respective new optimal cypher configuration(s) that were provided.

2. The method of claim 1, wherein the change is a change to a threat landscape of the industrial system and/or a change to a regulatory requirement relevant the industrial system.

3. The method of claim 1, further comprising customizing the generated or updated optimal cypher configuration for a particular individual industrial device of the respective individual industrial devices for the particular individual industrial device.

4. The method of claim 1, wherein the device parameters for a particular individual industrial device of the respective individual industrial devices includes at least one of computation power of the particular individual industrial device, hardware acceleration capabilities for cypher computation of the particular individual industrial device, and geographic location of the particular individual industrial device.

5. The method of claim 1, wherein the system parameters for the industrial system include target security level (SL).

6. The method of claim 1, wherein the data source from which the device parameters for a particular individual industrial device of the plurality of industrial devices is the particular individual industrial device.

7. The method of claim 1, wherein the method is performed at a central location.

8. A method of automating cypher configuration of an industrial device of an industrial system, the method comprising:

connecting with a central cypher configuration module providing centralized cypher configuration for the industrial system;

receiving an optimal cypher configuration, wherein different configurations have different strengths of applied encryption and wherein the optimal cypher configuration is customized for the industrial device based on or using system parameters for the industrial system and device parameters for the industrial device, the system parameters indicating at least a target security level of the industrial system and the device parameters indicating at least one of computation power of the industrial device, hardware acceleration capabilities for cypher computation of the industrial device, and geographic location of the industrial device;

configuring the industrial device's cypher configuration using the optimal cypher configuration; and receiving new optimal cypher configuration from the central cypher configuration module, the new optimal cypher configuration being determined based on a determination by the cypher configuration module that at least one relevant change has occurred as indicated by update data from an external update server.

9. The method of claim 8, wherein the change is a change to a threat landscape of the industrial system and/or a change to a regulatory requirement relevant the industrial system.

10. The method of claim 8, further comprising providing the device parameters to the central cypher configuration module.

11. A central cypher configuration module for automating cypher configuration for a plurality of industrial devices within an industrial system, comprising:

a memory configured to store instructions;

at least one processing device disposed at a location and in communication with the memory, wherein the at least one processing device upon execution of the instructions is configured to:

receive system parameters for the industrial system;

receive from a data source, device parameters for respective individual industrial devices of the plurality of industrial devices;

select, generating and/or updating an optimal cypher configuration for the respective individual industrial devices based on or using the system parameters for the industrial system and the device parameters for the respective individual devices, wherein different cypher configurations have different strengths of applied encryption;

provide the respective optimal cypher configuration to the corresponding individual industrial devices for configuration of the individual industrial devices' cypher configuration;

receive update data;

monitor the update data for changes that impact cypher configuration needs of the industrial system and/or the plurality of industrial devices;

in response to determining at least change has occurred, determine if the optimal cypher configuration previously determined for the at least one of the respective individual industrial devices is still optimal;

in response to determining the optimal cypher configuration previously determined for the at least one of the respective individual industrial devices is no longer optimal, determine a new optimal cypher configuration for at least one of the respective individual industrial devices; and provide the respective new optimal cypher configuration(s) to the corresponding individual industrial devices of the at least one of the respective individual industrial devices for updated configuration of the at least one respective individual industrial devices' cypher configuration, including to cause configuration of the at least one of the respective individual industrial devices using the respective new optimal cypher configuration(s) that were provided.

12. The central cypher configuration module of claim 11, wherein the change is a change to a threat landscape of the industrial system and/or a change to a regulatory requirement relevant the industrial system.

13. The central cypher configuration module of claim 11, wherein the device parameters for a particular individual industrial device of the respective individual industrial devices includes at least one of computation power of the particular individual industrial device, hardware acceleration capabilities for cypher computation of the particular individual industrial device, and geographic location of the particular individual industrial device.

14. The central cypher configuration module of claim 11, wherein the at least one processing device is at a central location.

15. An industrial device comprising:

a memory configured to store instructions;

at least one processing device disposed at a location and in communication with the memory, wherein the at least one processing device upon execution of the instructions is configured to:

connect with a central cypher configuration module providing centralized cypher configuration for an industrial system;

receive an optimal cypher configuration, wherein different cypher configurations have different strengths of applied encryption and wherein the optimal cypher configuration is customized for the industrial device based on or using system parameters for the industrial system and device parameters for the industrial device, the system parameters indicating at least a target security level of the industrial system and the device parameters indicating at least one of computation power of the industrial device, hardware acceleration capabilities for cypher computation of the industrial device, and geographic location of the industrial device;

configure the industrial device's cypher configuration using the optimal cypher configuration; and receive new optimal cypher configuration from the central cypher configuration module, the new optimal cypher configuration being determined based on a determination by the cypher configuration module that at least one relevant change has occurred as indicated by update data from an external update server.

16. The industrial device of claim 15, wherein the at least one processing device upon execution of the instructions is further configured to provide the device parameters to the central cypher configuration module.

17. The method of claim 1, wherein providing the respective optimal cypher configurations to the corresponding individual industrial devices for configuration of the individual industrial devices' cypher configuration includes causing configuration of the individual industrial devices using the respective optimal cypher configurations that were provided.

* * * * *